United States Patent
Nakaike et al.

(10) Patent No.: US 10,275,335 B2
(45) Date of Patent: Apr. 30, 2019

(54) METHOD OF REORDERING CONDITION CHECKS BETWEEN VARIABLES BASED ON A FREQUENCY THAT CHECK IS SATISFIED

(71) Applicant: INTERNATIONAL BUSINESS MACHINES CORPORATION, Armonk, NY (US)

(72) Inventors: Takuya Nakaike, Kanagawa-ken (JP); Takeshi Ogasawara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/705,911

(22) Filed: Sep. 15, 2017

(65) Prior Publication Data

US 2018/0004625 A1 Jan. 4, 2018

Related U.S. Application Data

(63) Continuation of application No. 15/050,912, filed on Feb. 23, 2016, now Pat. No. 10,025,690.

(51) Int. Cl.
G06F 11/36 (2006.01)
G06F 8/41 (2018.01)

(52) U.S. Cl.
CPC ........ *G06F 11/3608* (2013.01); *G06F 8/4441* (2013.01); *G06F 8/45* (2013.01);
(Continued)

(58) Field of Classification Search
CPC .............. G06F 8/4441; G06F 8/44463; G06F 11/3644; G06F 11/366; G06F 11/3664
See application file for complete search history.

(56) References Cited

U.S. PATENT DOCUMENTS 7,574,695 B2 8/2009 Chander et al.
8,645,924 B2 2/2014 Li et al.
(Continued)

FOREIGN PATENT DOCUMENTS

EP 2063355 5/2009

OTHER PUBLICATIONS

Unicode and You by BetterExplained.com historical version from Aug. 20, 2007 found via WayBack Machine https://web.archive.Org/web/20070820164238/https://betterexplained.com/articles/unicode/ (Year: 2007).*

(Continued)

*Primary Examiner* — Joseph O Schell
(74) *Attorney, Agent, or Firm* — Tutunjian & Bitetto, P.C.; Vazken Alexanian

(57) ABSTRACT

Described is a computer-implemented method of reordering condition checks. Two or more condition checks in computer code that may be reordered within the code are identified. It is determined that the execution frequency of a later one of the condition checks is satisfied at a greater frequency than a preceding one of the condition checks. It is determined that there is an absence of side effects in the two or more condition checks. The values of the condition checks are propagated and abstract interpretation is performed on the values that are propagated. It is determined that the condition checks are exclusive of each other, and the condition checks are reordered within the computer code.

20 Claims, 11 Drawing Sheets

(52) U.S. Cl.
CPC ......... *G06F 11/3612* (2013.01); *G06F 8/458* (2013.01); *G06F 11/3644* (2013.01); *G06F 11/3664* (2013.01)

(56) References Cited

U.S. PATENT DOCUMENTS

| | | | |
|---|---|---|---|
| 8,726,252 B2 | 5/2014 | Eichenberger et al. | |
| 8,943,487 B2 | 1/2015 | Li et al. | |
| 2004/0019770 A1* | 1/2004 | Kawahito | G06F 8/4441 712/227 |
| 2005/0097397 A1* | 5/2005 | Wu | G06F 11/2257 714/31 |
| 2011/0113224 A1* | 5/2011 | Isshiki | G06F 11/3419 712/240 |
| 2012/0054470 A1* | 3/2012 | Ishizaki | G06F 8/4441 712/205 |
| 2014/0115305 A1* | 4/2014 | Johnson | G06F 8/4441 712/241 |
| 2014/0164747 A1 | 6/2014 | Gschwind et al. | |
| 2016/0110806 A1 | 4/2016 | Bent | |
| 2017/0060575 A1 | 3/2017 | Agrawal | |

OTHER PUBLICATIONS

Improving Performance by Branch Reordering by Yang Proceedings of the ACM SIGPLAN Conference on Programming Language Design and Implementation, Jun. 1998 (Year: 1998).*

List of IBM Patents or Patent Applications Treated as Related dated Sep. 15, 2017, 2 pages.

Minghui Yang et al., Improving Performance by Branch Reordering, Proceedings of the ACM SIGPLAN Conference on Programming Language Design and Implementation (PLDI), Jun. 1998.

Minghui Yang et al., Efficient and Effective Branch Reordering Using Profile Data, ACM Transactions on Programming Languages and Systems, vol. 24, No. 6, Nov. 2002, pp. 667-697.

* cited by examiner

```
Object value;
String(char[] data, int start, int length)
{ // A constructor of String class
  boolean isCompressed = true;
  value = new byte[length];
  for (int i = 0; i < length; i++) {
    if (data[i + start] <= 255)
      ((byte[]) value)[i] = data[i + start];
    else {
      isCompressed = false;
      break;
    }
  }
  if (!isCompressed) {
    value = new char[length];
    // Copy data to value
    ...
```

```
char charAt(int index) { // Access a
character
  if (value instanceof char[])
    return ((char[]) value)[index];
  else if (value instanceof byte[])
    return (char) ((byte[]) value)[index];
```

FIG. 7

METHOD OF REORDERING CONDITION CHECKS BETWEEN VARIABLES BASED ON A FREQUENCY THAT CHECK IS SATISFIED

BACKGROUND

Technical Field

The present invention relates to software analysis, particularly to reordering the condition checks within software code.

Description of the Related Art

Elseif is a conditional statement in computer code that combines the if and else conditional statements. Elseif will extend an if statement to execute a different statement in case the preceding if expression is evaluated as FALSE. Unlike an else statement, the body block of an elseif statement is executed only if the elseif conditional expression is evaluated as TRUE.

When a computer program contains if and elseif statements, the if statement is checked first. As indicated, when the if statement is evaluated as FALSE, then the elseif statement is checked.

In computer programming languages such as Java™ and other scripting languages, there are many elseif statements that use instanceof operations to test and evaluate objects. The syntax of an instanceof statement is "object instanceof constructor". The constructer is the function that the object is tested against. Instanceof statements carry a high cost in terms of computer run time, processing resources, etc., particularly when compared to comparing and testing variables of primitive data types, such as integers.

In the execution of the computer program, when the if statement is rarely evaluated as TRUE and the elseif statement is frequently evaluated as TRUE, then the cost in terms of computer run time, processing resources, etc. is increased.

SUMMARY

According to present principles, described herein is a computer-implemented method of reordering condition checks. In the method, two or more condition checks in computer code that can be reordered are identified. It is determined that a later one of the condition checks is satisfied at a frequency that is greater than the frequency at which a preceding one of the condition checks is satisfied. It is determined that there is an absence of side effects in the two or more condition checks. Values are propagated to satisfy the condition checks and abstract interpretation is performed on the values that are propagated. It is then determined that the condition checks are exclusive of each other, and the condition checks are reordered within the computer code. At least one of the above occur in a hardware processor.

Further in accordance with present principles, described is a system for reordering condition checks. The system includes one or more processors including memory that processes and stores computer code that includes two or more condition checks. A condition check frequency determiner is used to determine the frequency at which two or more condition checks are satisfied. A value propagator propagates values of the conditions in order to evaluate the condition checks, and an abstract interpreter performs abstract interpretation on the propagated values to determine if the condition checks are exclusive to each other. A condition check reorderer reorders a later condition check and a preceding condition check that are found to be exclusive of each other.

Still further in accordance with present principles, described is computer program product for reordering condition checks, the computer program product comprising a non-transitory computer readable storage medium having program instructions embodied therewith, the program instructions being executable by a computer to cause the computer to perform a method in which two or more condition checks in a computer code that can be reordered within the code are identified. It is determined that a later one of the condition checks is satisfied at a frequency that is greater than the frequency at which a preceding one of the condition checks is satisfied. It is determined that there is an absence of side effects in the two or more condition checks. Values are propagated to satisfy the condition checks and abstract interpretation is performed on the values that are propagated. It is then determined that the condition checks are exclusive of each other, and the condition checks are reordered within the computer code.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein:

FIG. 7 shows exemplary code depicting the compression of two byte character arrays of string objects into one byte arrays in accordance with an embodiment of the present principles;

DETAILED DESCRIPTION

According to present principles, described is a system and method for reordering condition checks in software programs. As indicated, the presence of condition checks in a software program that are not often executed, e.g., an if condition that is rarely evaluated as TRUE may increase computer run time costs, and drain computer processing resources, among other undesirable effects.

According to an embodiment of the present principles, the costs of condition checks are reduced by a method described herein in which if and elseif statements are reordered, if certain conditions are met, in order to more accurately reflect the frequencies at which the conditions are evaluated as TRUE. In one embodiment, when the condition checks are reordered, their positions within the code are switched, e.g., the elseif condition moves to the position of the if statement, and the if statement moves to the position of the elseif statement. Other reordering positions may be possible.

According to one other embodiment of the present principles, the condition checks of instanceof operations are reordered, if certain conditions are met, in order to more accurately reflect the execution frequency. The costs of condition checks may be reduced by reordering the instanceof operations as indicated herein.

According to one other embodiment of the present principles, the condition checks are reordered when a number of conditions are met. For example, if the frequency that an elseif condition check is evaluated as TRUE is greater than the frequency that a preceding if or elseif condition check is evaluated as TRUE, then the condition checks may be considered for reordering if (1) the condition checks do not have side effects, for example, the condition checks do not have side effects such as exceptions, stores to variables, and method calls; and (2) the if and elseif conditions are exclusive. When the if and elseif condition checks are reordered, the body blocks for the condition checks are also reordered.

Figure 1:
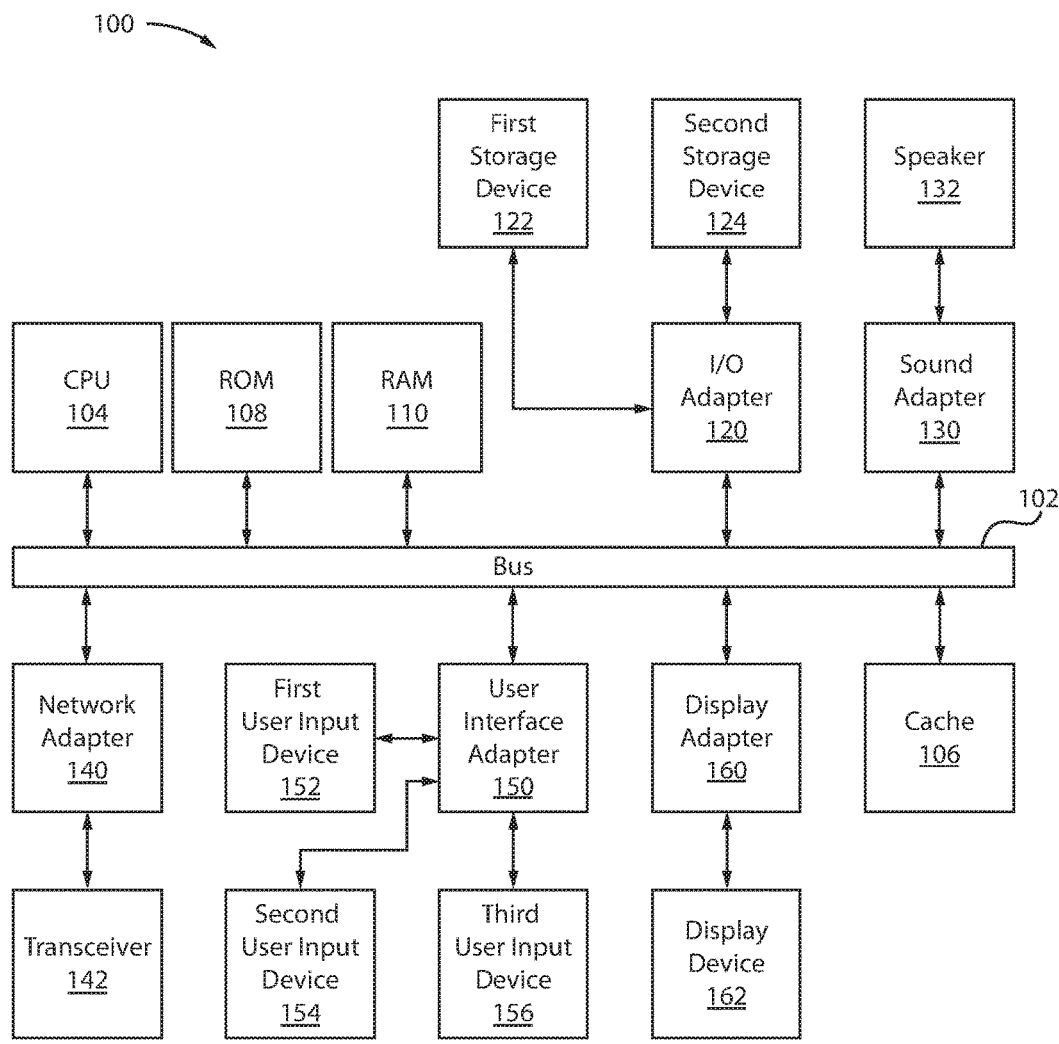
FIG. 1 shows an exemplary processing system to which the present principles may be applied.

Referring to FIG. 1, an exemplary processing system 100 to which the present principles may be applied is shown. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154 and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

The processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. It is to be appreciated that the terms processors and controllers can be used interchangeably herein. These and other variations of the processing system 100 are readily contemplated by one of ordinary skill in the art given the teachings of the present principles provided herein.

According to embodiments of present principles, a comparison is made between two or more condition checks to determine if they should be reordered. For example the two or more condition checks are monitored to determine how frequently each one is evaluated as TRUE. If it is found that the frequency that an elseif condition check is evaluated as TRUE is greater than the frequency that a preceding if or else if condition check is evaluated as TRUE, then the condition checks may be reordered, if the following additional conditions are met:

The condition checks do not have side effects (e.g., exceptions, stores to variables, and method calls), and the condition checks are exclusive to each other. If they are exclusive to each other, then the condition checks may be reordered. When the condition checks are reordered, the body blocks for the condition checks are also reordered.

A side effect is an operation that changes the state of an executed program. It may occur when a value is stored in a variable. Operations that include stores to variables are regarded as causing side effects. An example of a side effect operation is throwing an exception in a Java™ program since this involves the stores to the variables in a Java™ virtual machine. Another example is to call a method because stores to variables may exist in the called method. If it is known that the called method does not have any stores to variables, calling the method is not considered to have a side effect. Condition checks are never reordered if one of them has any side effect so as to avoid changing the program semantics.

Figure 2:
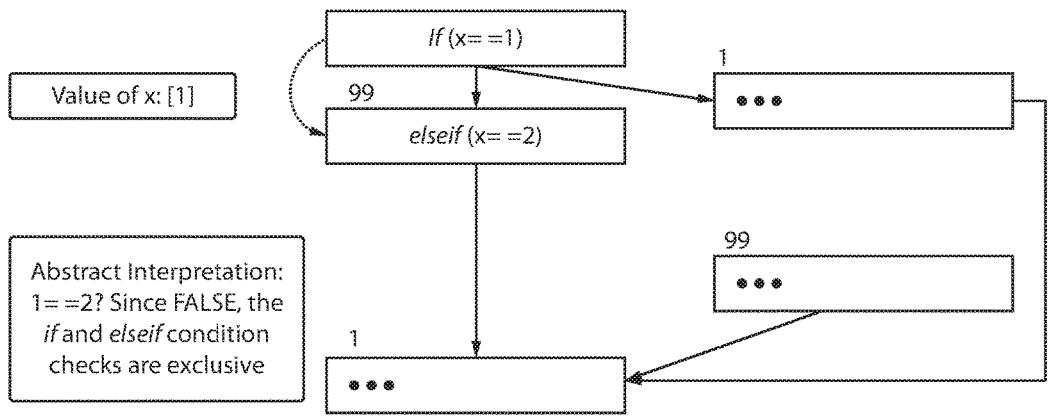
FIG. 2 shows an instance of where, in accordance with an embodiment of the present principles, if and elseif condition checks are found to be exclusive after propagation of values and abstract interpretation.

FIG. 2 depicts a situation in which it is determined that the if and else if condition checks are exclusive to each other. The values that satisfy the condition checks are propagated. For example, when an if (x==1) statement exists, "1" is propagated for the variable x because this condition check is satisfied (i.e. evaluated as TRUE) when x is 1. The succeeding condition checks are evaluated by using the propagated values. As this evaluation is done at compile time, it is called abstract interpretation or symbolic execution.

From abstract interpretation, it is determined whether the succeeding condition checks are satisfied or not satisfied. When the succeeding condition checks are not satisfied, then they are found to be exclusive for the preceding condition checks. With the finding of exclusivity, all conditions that support the reordering of the condition checks are found to be present. This is shown in FIG. 2, in which the abstract interpretation queries whether 1==2. Since this is FALSE, the values of the if and elseif condition checks are exclusive, and the condition checks can be reordered.

Figure 3:
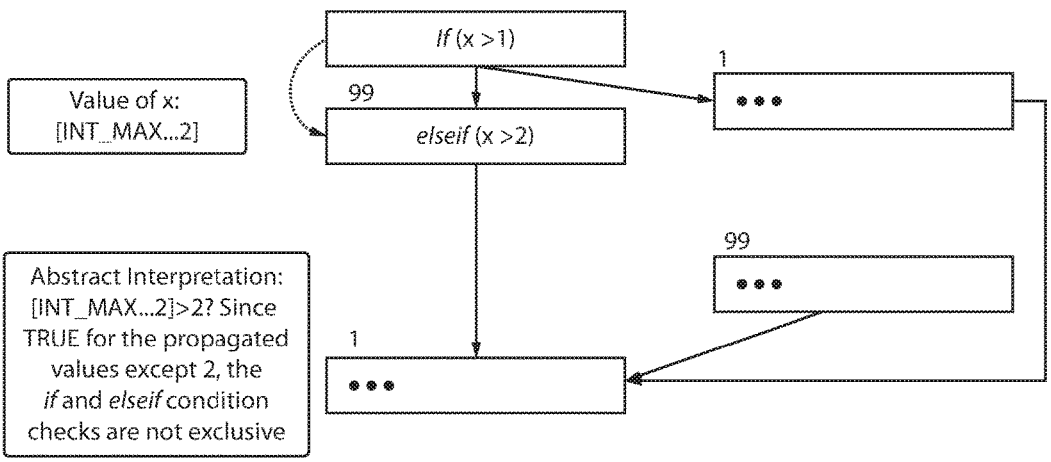
FIG. 3 shows an instance of where, in accordance with an embodiment of the present principles, if and elseif condition checks are found to not be exclusive after propagation of values and abstract interpretation.

FIG. 3 depicts a situation in which it is determined that the if and else if condition checks are not exclusive to each other. The values that satisfy the condition checks are propagated ([INT_MAX . . . 2]). Abstract interpretation is performed on the statement [INT_MAX . . . 2]>2? Since this statement is TRUE except where the propagated value is 2, the if and elseif condition checks are not exclusive.

Figure 4:
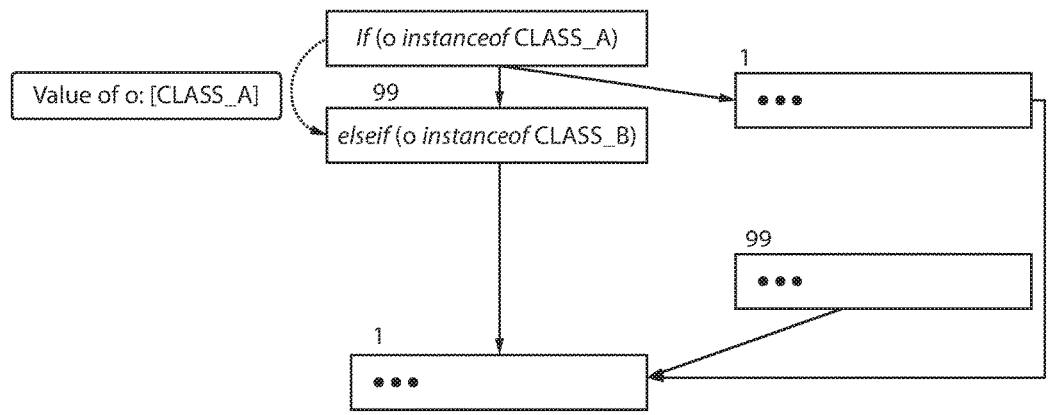
FIG. 4 shows an instance of the execution frequency of if and elseif condition checks that use instanceof statements in accordance with one embodiment of the present principles.

According to an embodiment of present principles depicted in FIG. 4, shown are two condition checks. The previous condition check is if (o instanceof CLASS_A) and the later condition check is elseif (o instanceof CLASS_B). The frequencies that the condition checks are evaluated as TRUE has been determined and it is found that the frequency that the later condition check ("elseif (o instanceof CLASS_B") is evaluated as TRUE is greater than the frequency that the previous condition check ("if o instanceof CLASS_A is evaluated as TRUE. The value to satisfy the condition check if (o instanceof CLASS_A) is propagated (value of o: [CLASS_A] to see if CLASS_A instanceof CLASS_B is satisfied. If satisfied, then the condition checks are nonexclusive. If not satisfied, then the condition checks are exclusive.

As shown in FIG. 4, "o" is an object. The curved dashed segment culminating in an arrow signifies that a value is propagated. The boxes and solid lines represent a control flow. Each box is a basic block which is the straight line code. In a basic block, a branch can exist only at the end of the straight line code. In this example, the first basic block has a branch which is the if condition check. Since a branch exists, the basic block has two edges which are represented as arrows. One edge is the control flow to the basic block including the elseif condition check when the if condition check is not satisfied. The other edge is the control flow to another basic block which is the body of the if condition check (e.g., the code when the if condition check is satisfied). The numbers (1, 99) are the execution frequencies of the edges. The first basic block has two edges, and one of the edges has 99 as the execution frequency and the other edge has 1. This means that one of the edge is executed 99 times and the other edge is executed 1 time. These edges represent the frequencies that condition checks are evaluated as TRUE.

Figure 5:
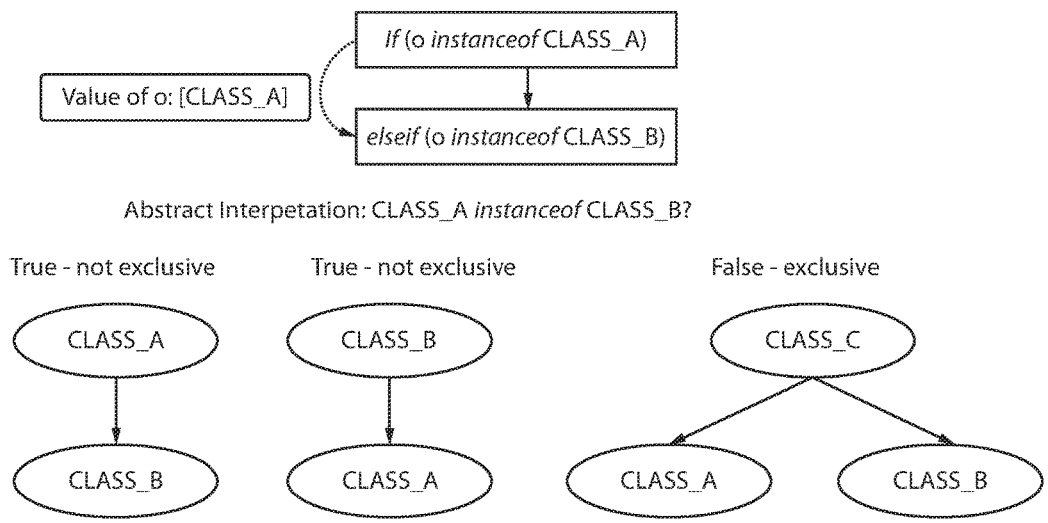
FIG. 5 shows an abstract interpretation of an instanceof condition checks after the values are propagated in accordance with an embodiment of the present principles.

FIG. 5 demonstrates an exemplary execution of an abstract interpretation, in which in interpreting instanceof conditions for two classes, the abstract interpreter checks the class hierarchies of the two classes. If one class is an ancestor of the other class, then the instanceof condition is evaluated as TRUE because in an ancestor situation, the data object can be a match with either class. The ancestors can be checked by traversing class hierarchy trees which are managed by language runtime systems such as Java™ virtual machines and compilers. Further, if the class is not loaded, at the time of compiling (e.g., it has not been used yet as a program runs), then the interpreter returns TRUE, e.g., a nonexclusive situation.

The class hierarchies are examined for classes A and B. The value of CLASS_A is propagated (value of o: CLASS_A) and an abstract interpretation is performed. In the first (left) case, CLASS_A is an ancestor of CLASS_B. Thus, the condition checks if (o instanceof CLASS_A) and elseif (o instanceof CLASS_B) are interpreted as nonexclusive because both condition checks can be evaluated as TRUE for an object. In the second (middle) case, CLASS_B is an ancestor of CLASS_A. Thus, the condition checks if (o instanceof CLASS_A) and elseif (o instanceof CLASS_B) are interpreted as nonexclusive because both condition checks can be evaluated as TRUE for an object. In the third (right) case, CLASS_B is not an ancestor of CLASS_A, and vice versa. Thus, the condition checks if (o instanceof CLASS_A) and elseif (o instanceof CLASS_B) are interpreted as exclusive because both condition checks are not evaluated as TRUE at the same time for an object. The statements involved in the nonexclusive determinations are not suitable for reordering, whereas the statement involved in the exclusive determination are suitable for reordering.

Figure 6:
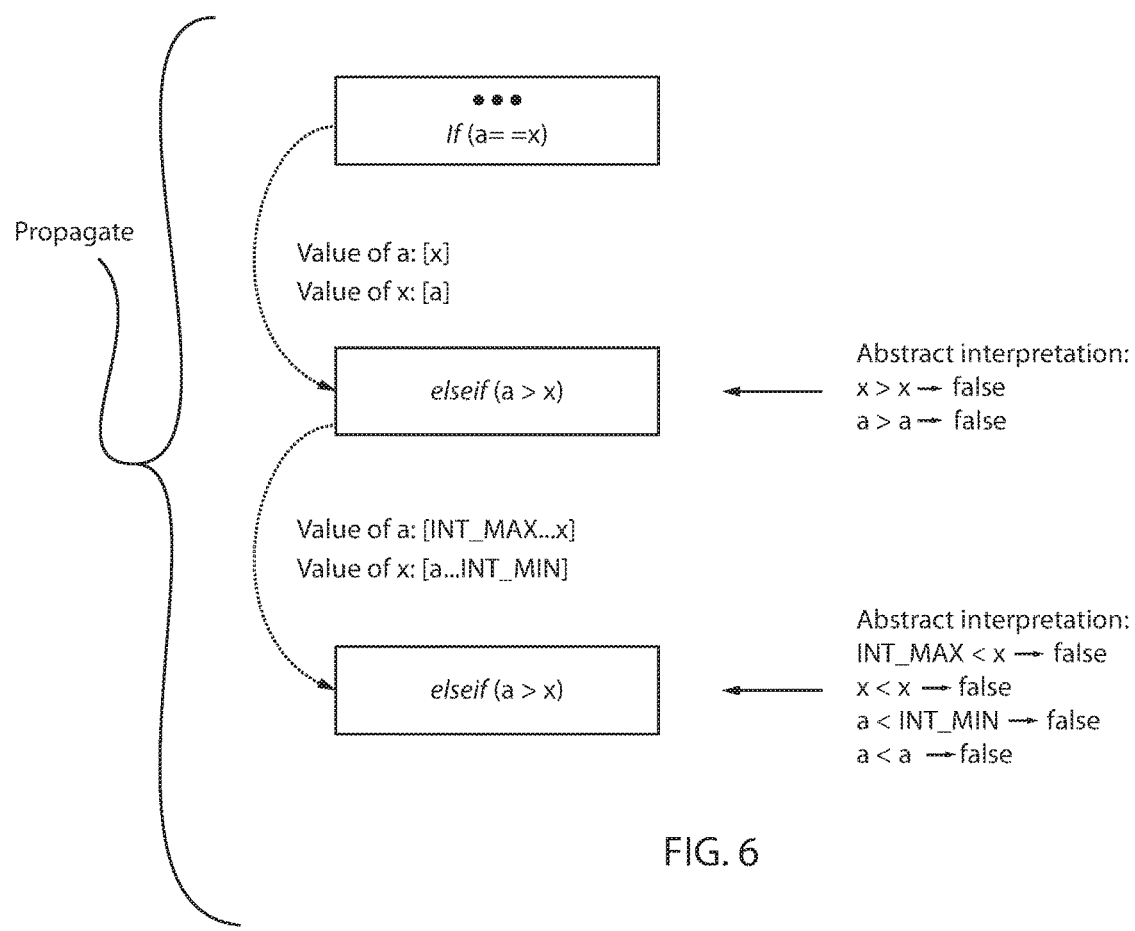
FIG. 6 shows another example of abstract interpretation of if and elseif condition checks after the values, which do not use constants, are propagated in accordance with an embodiment of the present principles.

Referring to FIG. 6, described is an embodiment in which an abstract interpretation is performed for condition checks that do not use constants. For example, in checking whether there is equality between variables a and x ("a==x") in which a variable a is compared with variable x, a range for one variable is generated using the other variable.

For example, in checking whether there is equality between a and x ("a==x"), the value of a is propagated as a value of x (value of a: [x]) and the value of x is propagated as a value of [a] (value of x: [a]). The next condition check "else if (a>x)" is evaluated by using the propagated values. The abstract interpretation for this condition check with the propagated value for the variable a (i.e. [x]) returns FALSE because x>x is not satisfied. Similarly, the abstract interpretation for this condition check with the propagated value for x (i.e. [a]) returns FALSE because a>a is not satisfied. Since the results for all the abstract interpretations are FALSE, the if and elseif condition checks can be reordered. In further value propagations (e.g., value of a: [INT_MAX . . . x] and value of x: [a: . . . INT_MIN]), the abstract interpretation for the condition check else if (a<x) with the propagated values for the variable a (i.e. [INT_MAX . . . x]) returns FALSE because INT_MAX<x is not satisfied and x<x is not satisfied. The abstract interpretation for the condition check else if (a<x) with the propagated values for the variable x (i.e. [a . . . MIN_INT]) returns FALSE because a<INT_MIN is not satisfied and a<a is not satisfied Referring to FIG. 7, described is an embodiment according to present principles of reordering condition checks implementing string compression in Java™. In Java™ the size of a character is two bytes. However, the first byte of a character is zero when the character format is ASCII which is used in English applications. In such a case, it is reasonable to compress a two byte character array into a one byte character array to reduce the memory consumption. This approach is available to compress a character array in a string object. The upper code block of FIG. 7 shows how a character array is compressed when a string object is created at a constructor which receives a character array (data), with the start offset of the characters (start), and the length of the characters (length) as arguments. As shown, the characters in the array, which are received as an argument, are copied into a one byte character array, which type is byte[ ], if the first bytes of all of the characters are zero. The character arrays are not compressed if at least the first byte of one of the characters in the arrays is not zero. Therefore, a string object can store two types of arrays in a single field which type is Object (value). The type of the character array needs to be checked when a character is accessed from a string object. For this type checking, if and elseif condition checks are used with instanceof operations as shown in the bottom block of code in FIG. 7. In this example, the elseif condition check is evaluated as TRUE more frequently than the if condition check when ASCII characters are dominant. In this case, reordering the condition checks reduces the costs for the condition checks, and improves computing performance.

Figure 8:
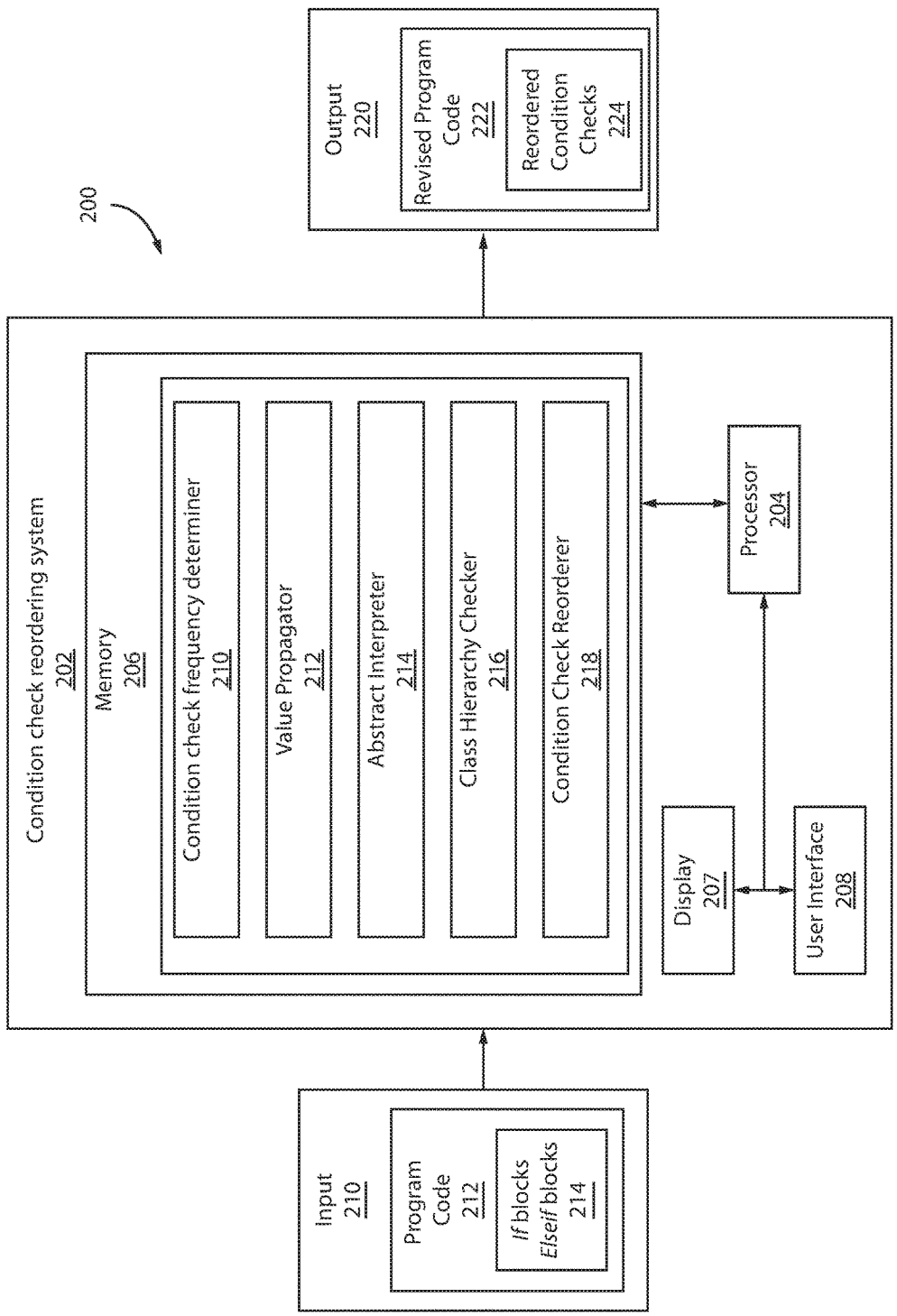
FIG. 8 shows an shows an exemplary system for reordering condition checks in accordance with an embodiment of the present principles.

The type of array that is kept in a string object has either a char[ ] type or a byte [ ] type. In one embodiment, type checks (e.g., "{" are used to access the characters. In one embodiment, the overhead of the type checks is reduced when the elseif blocks are reordered. Byte type string objects (byte[ ]) can be checked first for English applications and check for char type string object (char[ ]) for the other applications With reference to FIG. 8, a system 200 for the reduction of condition checks is depicted. The system may implement embodiments of the present principles. Part or all of processing system 100 may be implemented in one or more of the elements of system 200.

Figure 9:
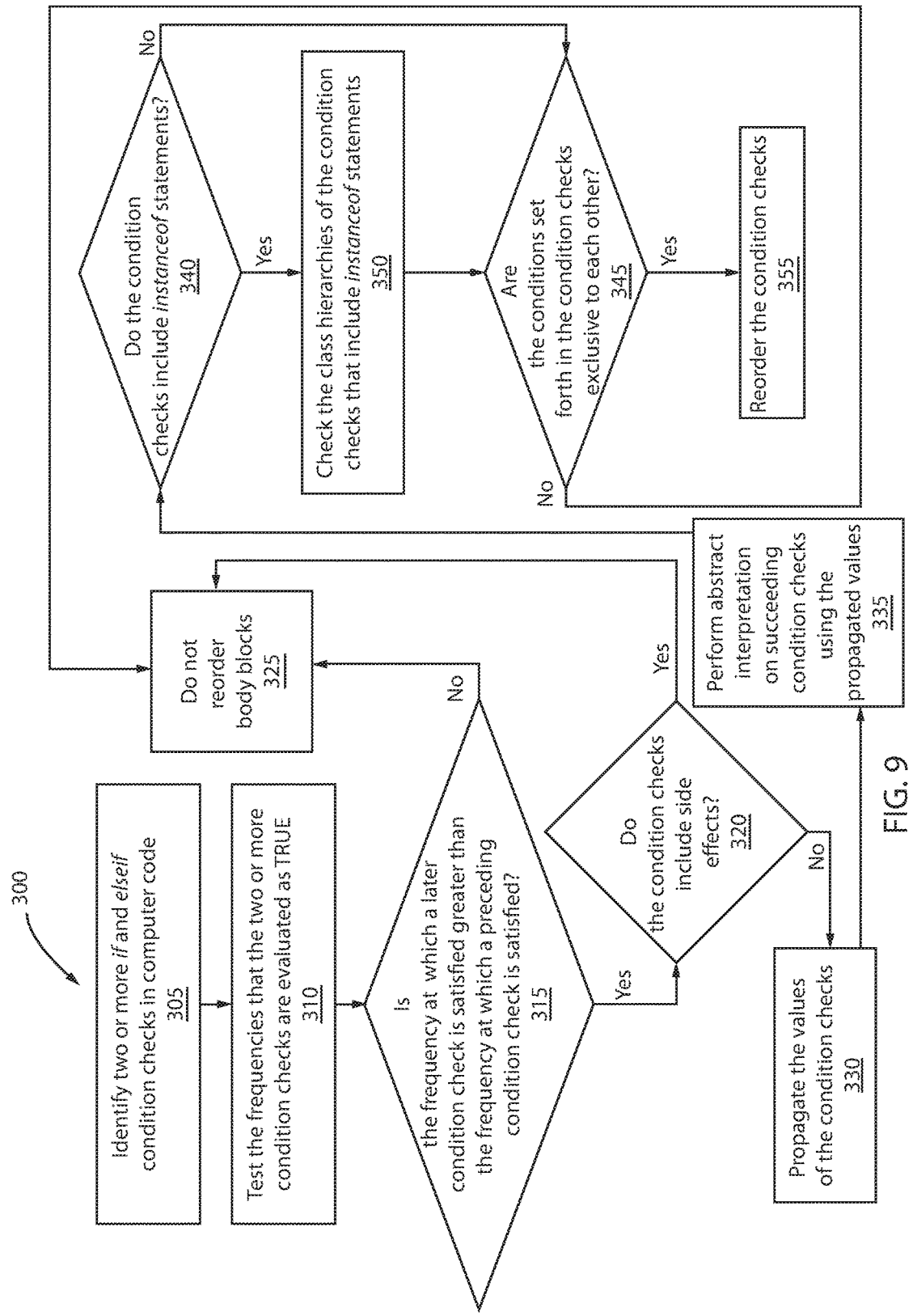
FIG. 9 shows an exemplary method for reordering condition checks in accordance with an embodiment of the present principles.

Further, it is to be appreciated that processing system 100 may perform at least part of the method described herein including, for example, at least part of method 300 of FIG. 9. Similarly, part or all of system 200 may be used to perform at least part of method 300 of FIG. 9.

System 200 is shown with respect to an operational environment in which it can be utilized, in accordance with an embodiment of the present principles. System 200 preferably includes a condition check reordering system 202 that includes one or more processors 204 and memory 206 for storing applications, modules and other data. In one embodiment, the memory unit 206 includes a large number of memory blocks. The system 200 may also include one or more displays 207 for viewing content. The display 207 may permit a user to interact with the system and its components and functions. This may be facilitated by the inclusion of a user interface 208, which may include a mouse, joystick, or any other peripheral or control to permit user interaction with the system and/or its devices. It should be understood that the components and functions of the system may be represented as one or more discrete systems or workstations, or may be integrated as part of a larger system or workstation.

System 200 is depicted as a computer-implemented approach to a condition check reordering system, resulting in faster processing time, lower system latency and more efficient use of memory space. This is particularly true in checking a computer program as it runs for purposes of determining whether condition checks can be reordered when the conditions for doing same are met. Reordering the condition checks in this manner may insure that the data is processed and the program code is executed as efficiently as possible.

System 200 receives input 210, which may include program code 212 that may contain if and elseif condition checks that may not be ordered according to the frequencies that the condition checks are evaluated as TRUE. For example, if the if condition set forth in a block is rarely TRUE and elseif condition set forth in a subsequent condition block is frequently TRUE, then reordering the condition blocks may reduce the cost of performing condition checks and provide for more efficient execution of program code.

The condition check reordering system 202 includes a condition check frequency determiner 210, a value propagator 212, an abstract interpreter 214, a class hierarchy checker 216, and a condition check reorderer 218. After the system 200 performs operations, revised program code 222 containing reordered condition checks 224, e.g., reordered if and elseif condition checks, may be output 220 from the system.

The condition check frequency determiner 210 determines the number of times if and elseif condition checks are evaluated as TRUE. In one embodiment, the condition check frequency determiner 210 searches for instances where the frequency that an elseif condition check is evaluated as TRUE is greater than the frequency of a preceding if or elseif condition check is evaluated as TRUE. In one other embodiment, the condition check frequency determiner 210 further determines if the condition checks set forth in the blocks do not have side effects, e.g., no exceptions, no stores to variables, and no method calls, among others.

The value propagator 212 propagates the values to satisfy the condition checks. The abstract interpreter 214 uses the information generated by the value propagator 212 to perform abstract interpretation on the propagated values of the condition checks. For example, the abstract interpreter 214 uses the values propagated by the value propagator to determine if there are instances where the classes of data are exclusive to each other.

The class hierarchy checker 216 is an optional unit provided for situations in which the condition checks include instanceof statements. The class hierarchy checker 216 performs checks on classes subject to instanceof conditions. After the value propagator 212 propagates the values of the instanceof conditions, the class hierarchy checker 216 determines if a variable is a member of two or more classes, which would show that the variable is not exclusive to one particular class (e.g., that one class is an ancestor of another class). If it is found that a class is an ancestor of another class, then the instanceof operation is evaluated as TRUE, e.g., no exclusivity. Further, if a class is not loaded at the time of compiling, then the operation is also evaluated as TRUE e.g., no exclusivity. In one embodiment, the class hierarchy checker is a separate unit. In another embodiment, the class hierarchy checker functions are performed by the abstract interpreter.

Condition check reorderer 218 receives information from the condition check frequency determiner 210, the value propagator 212, and the abstract interpreter 214, and when the condition checks include instanceof statements, then the class hierarchy checker 216. The condition check reorder 218 determines if 1) the frequency that an elseif condition check is evaluated as TRUE is greater than the frequency of a preceding if or elseif condition check is evaluated as TRUE; 2) there are no side effects of the condition check; and 3) the if and elseif condition checks are exclusive to each other. If the outcomes of all three conditions are TRUE, then the block reorderer will reorder two or more condition checks and the body blocks for the condition checks.

The above embodiment of system 200 is merely exemplary. Variations of this embodiment and other embodiments altogether that implement the present principles are within the scope of the present disclosure. For example, it the value propagator and the abstract interpreter may be combined into a unit. Similarly, the condition check execution frequency determiner may also perform the block reordering, thus combining the condition check frequency determiner and the block reorderer in a single unit.

Referring to FIG. 9, an exemplary method 300 of reordering condition checks, in accordance with an embodiment of the present principles, is described. Part or all of method 300 may be performed by system 200 of FIG. 8.

In block 305, condition checks (e.g., if and elseif condition checks) are identified in computer code to determine if the condition checks may be reordered.

In block 310, the frequencies that the two or more condition checks are evaluated as TRUE are determined.

Block 315 is a decision block in which it is determined if the frequency at which a later condition check is satisfied greater than the frequency at which a preceding condition check is satisfied. If the determination is YES, then proceed to block 320. If the determination is NO, then proceed to block 325.

Block 320 is a decision block in which it is determined whether the condition checks have side effects. For example, the side effects may be exceptions, stores to variables, and method calls. If there are no side effects associated with the condition checks (e.g., the determination is NO), then proceed to block 330. If there are side effects associated with the condition checks (e.g., the determination is YES), then proceed to block 325.

In block 330, the values of the conditions are propagated, to provide information used in determining whether the conditions are exclusive to each other.

In block 335, the succeeding condition checks are executed by performing abstract interpretation using the propagated values.

Block 340 is a decision block in which it is determined whether the condition checks include instanceof statements. If the determination is YES, then proceed to block 350. If the determination is NO, then proceed to block 345.

Block 345 is a decision block that determines, after value propagation and abstract interpretation (and in certain instances, after class hierarchies are checked in block 350), whether the conditions set forth in the condition checks are exclusive to each other. If the determination is YES, then proceed to block 355. If the determination is NO, then proceed to block 325.

Block 350 is implemented when decision block 340 determines YES—the condition checks under consideration include instanceof statements. Block 350 checks the class hierarchies of the instanceof statements. In one embodiment, class hierarchies are checked by propagating the values of the instanceof statements and by executing the succeeding condition checks by performing abstract interpretation using the propagated values.

When the condition checks contain instanceof statements, a further decision is made in block 345 on whether the classes that are the subject of the instanceof statements are exclusive to each other. Block 345 makes the determination based on the information generated in block 350, where the values of the instanceof statements are propagated and abstract interpretation is performed. If the determination is YES (e.g., exclusive) then proceed to block 355 from block 345. If the determination is NO (e.g., not exclusive) then proceed to block 325 from block 345.

In block 355, the body blocks containing the condition checks are reordered in the computer code. In one embodiment, a body block containing a later condition check that is satisfied at a frequency that is greater than the frequency at which a preceding condition check is satisfied (e.g., decision in block 315 returns YES) is moved up in the code, and the condition check executing less frequently is moved down. In addition to finding a later condition check that executes more frequently than one that preceded it, the following additional conditions should been met for reordering: the condition checks should not have side effects (decision block 320 returns NO), after value propagation (block 330) and abstract interpretation (block 335) the conditions should be found to be exclusive to each other (decision block 345 returns YES), and in the case where the condition checks are found to include instanceof statements (decision block 340 returns YES), then exclusivity is found after the class hierarchies are checked (decision block 345 returns YES).

In block 325, the instruction is given to not reorder the body blocks. This instruction should be given in case one of the following occurs: a body block containing a later condition check is satisfied at a frequency that is less than the frequency at which a preceding condition check is satisfied (decision in block 315 returns NO); the condition checks have side effects (decision block 320 returns YES); the conditions are found to not be exclusive to each other (decision block 345 returns NO after value propagation (block 330) and abstract interpretation (block 335) are executed); and in the case where the condition checks are found to include instanceof statements (decision block 340 returns YES), then a lack of exclusivity is found after the class hierarchies are checked in block 350 (decision block 345 returns NO).

Figure 10:
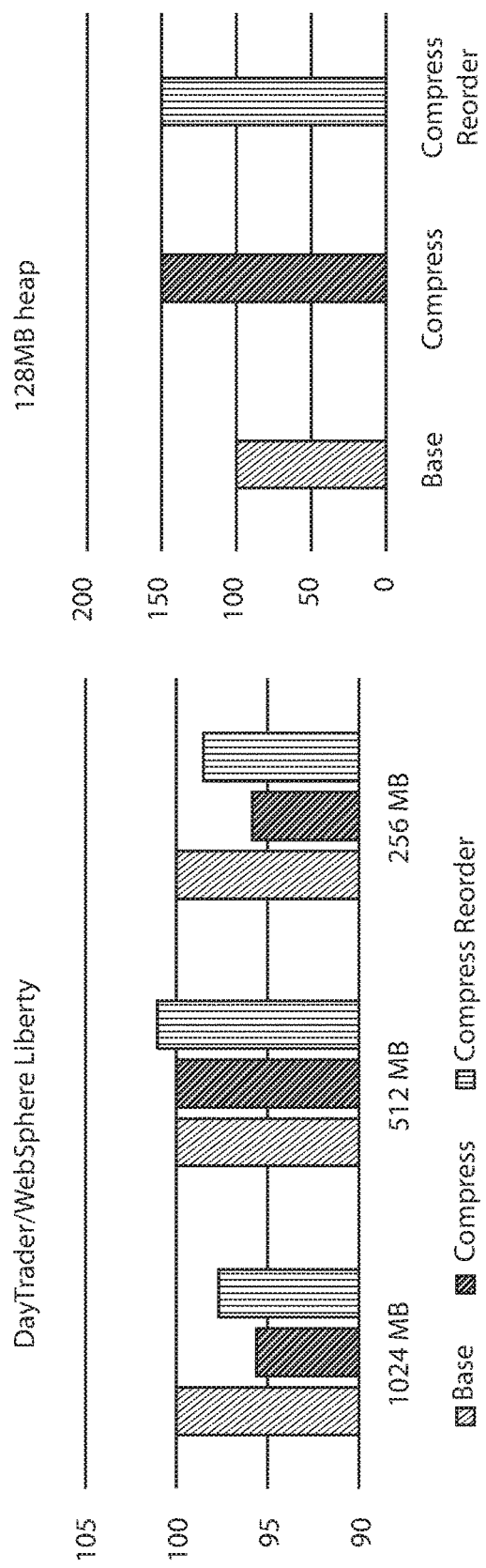
FIG. 10 depicts test results in which condition checks are reordered in accordance with an embodiment of the present principles.

The method of reordering condition checks offers several advantages. For example, FIG. 10 depicts the results of a test which demonstrates that a condition check reordering system according to present principles significantly improves computer processor performance. In the test, the string compression described above in relation to FIG. 7 is implemented in an IBM Java™ SDK Version 8 and a benchmark called DayTrader is run to measure performance. The performance is measured along with changing the heap size of the Java™ virtual machine (JVM). The values in the along the y-axis of the left plot (i.e. 1024 MB, 512 MB, and 256 MB) are the heap sizes. The left plot shows the relative throughput of three configurations which are Base, Compress, and Compress Reorder. Base is the baseline performance when string compression is not used. Compress is the performance when string compression is used, but condition checks are not reordered (i.e. value instanceof char[ ] in FIG. 7 is examined first). Compress Reorder is the performance when the string compression is used with condition check reordering (i.e. value instanceof byte[ ] in FIG. 7 is examined first). As shown the left plot, the bars for Compress are lower than the bars for Base. This shows the string compression degrades the performance because of the overhead for the string compression. The bars for Compress Reorder are higher than the bars for Compress. This shows that condition check reordering reduces the overhead for the string compression.

The right plot of FIG. 10 shows the performance when the heap size is 128 MB. As the heap size of a JVM reduces, the performance degrades because garbage collections occurs frequently. Since the string compression reduces the heap consumption by shrinking the sizes of string objects, it reduces the overhead for garbage collection. With the 128 MB heap, the overhead for garbage collection is very large in this benchmark. Therefore, the string compression improves the performance significantly. By reordering condition checks to give priority to those that execute most frequently, performance may improve on the order of about 1.2% to about 2.8% when heap size is larger than 128 MB.

In a scripting language such as Python, which is a dynamically typed language, the variables are not static type. Where there are many if and elseif condition checks used with instanceof operations in an application written in Python, the variable type is always checked when it is accessed. For example, when a large number of condition checks are used with instanceof operations to access variables, e.g., when 6 or so condition checks are set forth, condition check reordering should effectively improve the run time performance, particularly when the frequencies at which the condition checks evaluated as TRUE are biased towards later condition checks.

While the present disclosure includes a detailed description on cloud computing, it should be understood that implementation of the subject matter described herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 11:
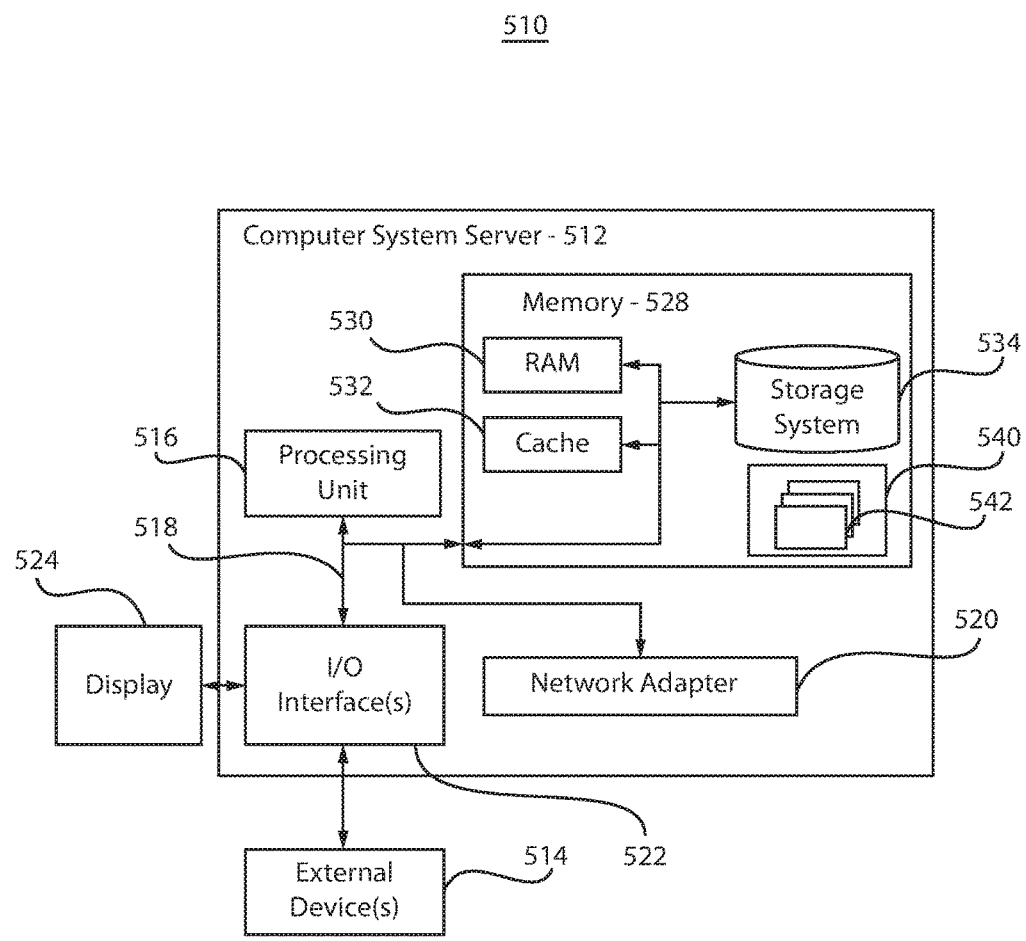
FIG. 11 shows an exemplary cloud computing node in accordance with an embodiment of the present principles.

Referring now to FIG. 11, a schematic of an example of a cloud computing node 510 is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to: microcode, device drivers, redundant processing units, external disk drive arrays, RAID systems, tape drives, and data archival storage systems, etc.

Figure 12:
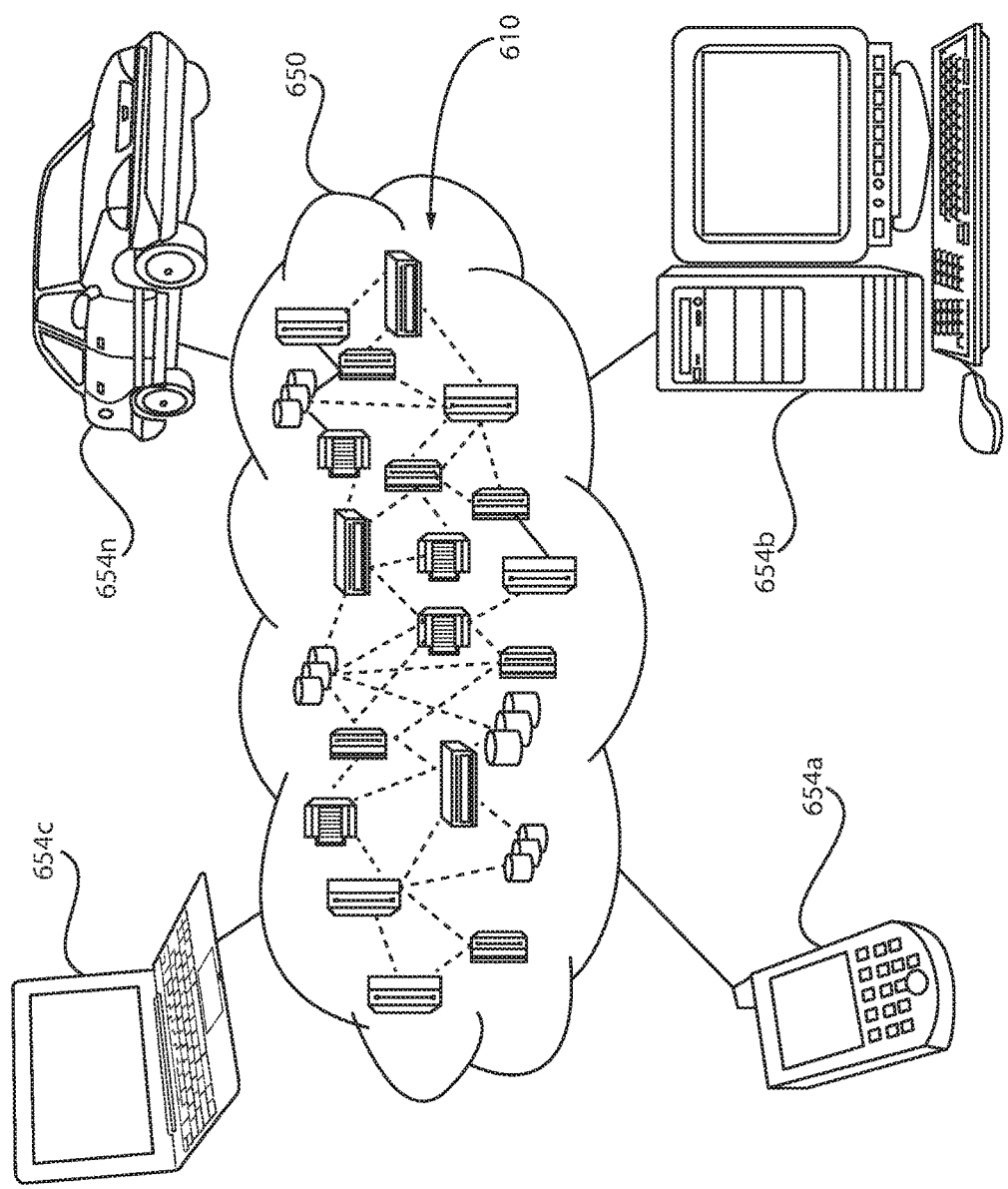
FIG. 12 shows an exemplary cloud computing environment in accordance with an embodiment of the present principles.

Referring now to FIG. 12, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 12 are intended to be illustrative only and that computing nodes 610 and cloud computing environment 650 can communicate with any type of computerized device over any type of network and/or network addressable connection (e.g., using a web browser).

Figure 13:
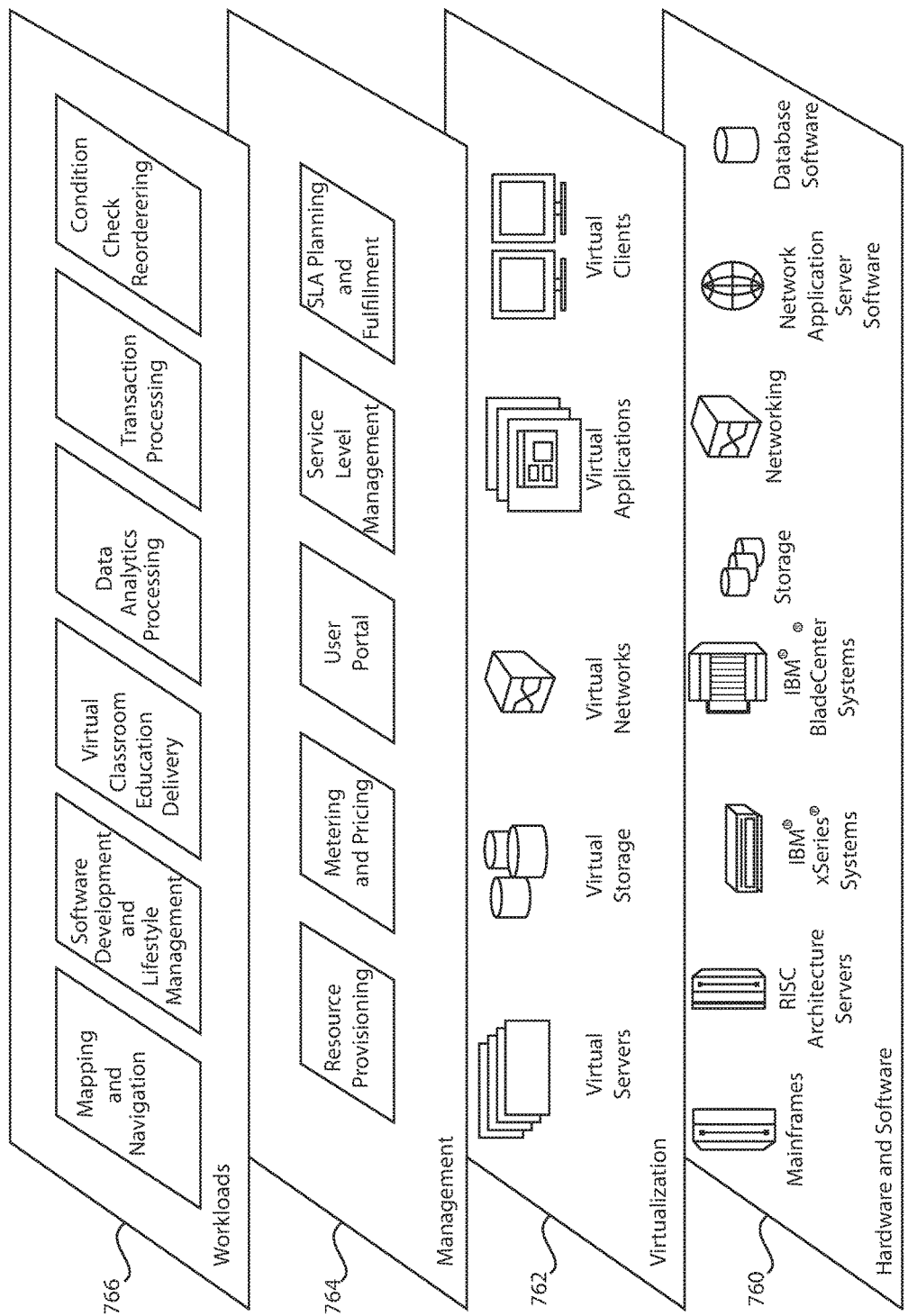
FIG. 13 shows exemplary abstraction model layers, in accordance with an embodiment of the present principles.

FIG. 13 shows a set of functional abstraction layers provided by cloud computing environment 650. It should be understood in advance that the components, layers, and functions shown in FIG. 13 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; transaction processing; and condition check reordering.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java™, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of reordering condition checks, which are intended to be illustrative and not limiting, it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method of reordering condition checks, comprising:
    identifying two or more condition checks in computer code that can be reordered within the code, each of the condition checks including a comparison between two or more variables;
    determining that a later one of the condition checks is satisfied at a frequency that is greater than a frequency at which a preceding one of the condition checks is satisfied;
    determining if there is an absence of side effects in the two or more condition checks;
    propagating values using an abstract interpretation to satisfy the condition checks;
    determining that the condition checks are exclusive of each other; and
    reordering the condition checks within the computer code using a hardware processor, wherein the reordering of the condition checks increases computer code processing speeds.

2. The method of claim 1, wherein the determining that a later one of the condition checks is satisfied at a frequency that is greater than the frequency at which a preceding one of the condition checks is satisfied comprises determining that a frequency that a later one of the condition checks is evaluated as TRUE is greater than a frequency that a preceding one of the condition checks is evaluated as TRUE.

3. The method of claim 1, wherein at least one of condition checks includes an if statement and at least another one of the condition checks includes an elseif statement.

4. The method of claim 1, wherein at least one of condition checks includes an if statement that precedes at least one of the condition checks that includes an elseif statement.

5. The method of claim 1, wherein the two or more condition checks include instanceof statements, and the method further comprises determining whether the classes that are the subject of the instanceof statements are exclusive of each other.

6. The method of claim 1, wherein the two or more condition checks include instanceof statements, and the method further comprises determining whether the classes that are the subject of the instanceof statements are exclusive of each other by checking the hierarchies of the classes.

7. The method of claim 1, wherein the condition checks include variables and performing the abstract interpretation including defining a first variable as a range of the second variable.

8. The method of claim 1, wherein the computer code is ASCII code and 2-byte character arrays of string objects are compressed into 1-byte arrays when a first byte of a ASCII character is zero.

9. The method of claim 1, wherein the side effects include exceptions, stores to variables, and method calls.

10. A system for transferring arrays of data objects by remote data memory access, comprising:
    one or more processors including memory that processes and stores computer code that includes two or more condition checks, each of the condition checks including a comparison between two or more variables;
    a condition check frequency determiner that determines a frequency at which two or more condition checks are satisfied;
    a value propagator that propagates values using an abstract interpretation for evaluating the condition checks; and
    a condition check reorderer that reorders a later condition check and a preceding condition check that are found to be exclusive of each other.

11. The system of claim 10, wherein the condition check execution frequency determiner is configured to determine a frequency at which a condition check including an if statement is TRUE and a frequency at which a condition check including an elseif statement is TRUE.

12. The system of claim 10, further comprising a class hierarchy checker that determines whether condition checks directed to two or more classes that are the subject of instanceof statements are exclusive of each other.

13. The system of claim 10, further comprising a class hierarchy checker that determines whether condition checks directed to two or more classes that are the subject of the instanceof statements are exclusive of each other, wherein the class hierarchy checker performs one or both of a propagation of values of the classes of the instanceof statements and the abstract interpretation on the propagated values of the classes of the instanceof statements to determine if the condition checks are exclusive to each other.

14. The system of claim 10, further comprising an abstract interpreter configured to perform the abstract interpretation on two or more variables that are the subject of the condition checks by defining a first variable as a range of the second variable.

15. The system of claim 10, wherein the system is configured to compress 2-byte character arrays of string objects in ASCII code into 1-byte arrays when a first byte of an ASCII character is zero.

16. A computer program product of reordering condition checks, the computer program product comprising a non-transitory computer readable storage medium having program instructions embodied therewith, the program instructions being executable by a computer to cause the computer to perform a method comprising:
   identifying two or more condition checks in computer code that can be reordered within the code, each of the condition checks including a comparison between two or more variables;
   determining that a later one of the condition checks is satisfied at a frequency that is greater than a frequency at which a preceding one of the condition checks is satisfied;
   determining if there is an absence of side effects in the two or more condition checks;
   propagating values using an abstract interpretation to satisfy the condition checks;
   determining that the condition checks are exclusive of each other; and
   reordering the condition checks within the computer code, wherein the reordering increases computer code processing speeds.

17. The computer program product of claim 16, wherein the program instructions executable by a computer cause the computer to perform the method that includes determining that a frequency that a later one of the condition checks is evaluated as TRUE is greater than a frequency that a preceding one of the condition checks is evaluated as TRUE.

18. The computer program product of claim 16, wherein the program instructions executable by a computer cause the computer to perform the method that includes determining whether classes that are the subject of instanceof statements included in the condition checks are exclusive of each other.

19. The computer program product of claim 16, wherein the program instructions executable by a computer cause the computer to perform the method that includes performing the abstract interpretation on condition checks that include variables by defining a first variable as a range of the second variable.

20. The computer program product of claim 16, wherein the program instructions executable by a computer cause the computer to perform the method that includes compressing 2-byte character arrays of string objects in ASCII code into 1-byte arrays when a first byte of an ASCII character is zero.

* * * * *